United States Patent [19]

Hartness et al.

[11] Patent Number: 4,723,649

[45] Date of Patent: Feb. 9, 1988

[54] APPARATUS FOR ALIGNING ARTICLES IN PARALLEL ROWS

[75] Inventors: Thomas S. Hartness; E. Leon Hopkins, both of Greenville, S.C.

[73] Assignee: Hartness International, Greenville, S.C.

[21] Appl. No.: 887,345

[22] Filed: Jul. 21, 1986

[51] Int. Cl.⁴ .............................................. B65G 47/26
[52] U.S. Cl. ..................................................... 198/442
[58] Field of Search .............. 198/442, 367, 836, 425; 91/37

[56] References Cited

U.S. PATENT DOCUMENTS

| | | | |
|---|---|---|---|
| 3,193,078 | 7/1965 | Amenta et al. | 198/442 X |
| 3,462,823 | 8/1969 | Heisler | 198/463.4 X |
| 3,767,026 | 10/1973 | Pagdin et al. | 198/442 |
| 3,822,006 | 7/1974 | Shuttleworth | 198/442 X |
| 4,066,163 | 1/1978 | Rowekamp | 198/442 |
| 4,147,248 | 4/1979 | Kurczak et al. | 198/442 X |
| 4,616,745 | 10/1986 | Hartness | 198/442 |

Primary Examiner—Robert J. Spar
Assistant Examiner—D. Glenn Dayoan
Attorney, Agent, or Firm—Dority & Manning

[57] ABSTRACT

The invention disclosed is an apparatus for automatically aligning and feeding articles on an article loading machine between dividers to form lanes of articles. The apparatus includes a pivoting guide chute which swings back and forth across a conveyor to discharge a predetermined number of articles intermittently into parallel lanes through actuation of jaws and/or a presser bar clamp assembly. An indexing assembly for the guide chute is provided which includes a double acting pneumatic cylinder and a connecting block which is slidably mounted and connected to the piston of the double acting cylinder. The connecting block has a plurality of interconnected guide slots in its upper surface with a stop position at each end of each slot. A second pneumatic cylinder having a cam follower which slides within the guide slots, blocks and releases the cam follower at each stop and thereby frees the first cylinder to move the chute to the next lane. A full charge of compressed air is kept on the drive cylinder at all times so that quick and positive lane indexing takes place. A pivotal guide bar assembly is provided which guides an article discharged from the chute towards a lane entrance.

24 Claims, 9 Drawing Figures

APPARATUS FOR ALIGNING ARTICLES IN PARALLEL ROWS

FIELD OF THE INVENTION

This invention relates to an apparatus for automatically dividing articles conveyed single file on an article packing machine into a plurality of parallel lanes or rows.

BACKGROUND OF THE INVENTION

In article loading machines and specifically in bottle handling machines, bottles are typically conveyed on a conveyor in a comingled manner. It is often necessary to separate the articles into aligned parallel rows for further conveyance of the articles to a packing station. At the packing station the bottles are often packed into containers which are partitioned. The separation of the articles or bottles into parallel rows by indexing means facilitates the packing of the bottles into the containers or cartons. Aligning of the commingled bottles into parallel rows is a problem to which considerable attention is given in the bottling and canning industries.

Prior bottle handling machines such as the case packing machine shown in U.S. Pat. Nos. 3,481,108 and No. 3,555,770 use a plurality of parallel spaced guide rails for separating a comingled group of bottles into aligned parallel rows. Often, however, the bottles become tilted on the conveyor and fall over in front of the guide rails, causing the bottles to jam up in front of the guide rails and requiring the stopping of the conveyor and repositioning of the bottles in an upright position by a machine attendant. U.S. Pat. No. 4,029,195 discloses cone-shaped guide members which wedge the tilted bottles into an upright position so that they may be guided individually into the parallel rows between the spaced rails.

Swing-arm article guiding chutes have been disclosed for use on bottle loading packing machines to feed the bottles into lanes. One proposed swing-arm device was manufactured by the Vicker's Miller/Hydro Manufacturing Company of Bainbridge, Georgia. To swing the chute, optical sensors activate electrical solenoid switches which, in turn, control an electric motor to swing the chute across the conveyor. An air cylinder piston rod provides a gate to hold the leading bottle in the chute until a lane is reached. The optical/solenoid control swing-arm device is complicated and expensive owing to the electrical wiring and other electrical elements required. The environment in which the swing-arm chute operates is not entirely suitable for optical sensor operation.

In my son's co-pending application entitled "Apparatus for Aligning and Feeding Articles Upright on an Article Loading Machine", Ser. No. 06/593,574, filed on Mar. 26, 1984, an article machine having a pivoting article chute is disclosed. In that machine, article clamps are provided adjacent the exit of the pivoting article chute for releasing an article carried therein into a lane at a predetermined time. The pivoting chute is indexed from one lane to a next lane by serially connected air cylinders.

Proper guidance of the article after being discharged from the pivoting guide chute adjacent the entrance of a lane is desirable. Often, an article will lag as it leaves the pivoting guide chute, thus causing the article to not be positioned correctly in front of the lane. This may cause the article to be knocked further out of position with respect to the lane by the pivoting guide chute as the pivoting guide chute pivots to adjacent another lane entrance. Thus, it is another important object of the present invention to provide an apparatus which allows maximum guidance of an article after the article is discharged from a pivoting guide chute.

U.S. Pat. No. 3,193,078 discloses a chute driven by a pneumatic cylinder and indexed with a ratchet. U.S. Pat. No. 4,147,248 discloses a chute activated by back-to-back pneumatic cylinders. It is another important object of the present invention to provide a means for indexing a guide chute which is quicker and more positive than prior art devices.

Another important object of the present invention is to provide an apparatus for automaticaly guiding articles conveyed on an article loading machine into parallel rows.

Still another object of the present invention is to provide an apparatus which automatically releases bottles into lanes defined between dividers on an article loading machine and indexes the releasing of the articles at an entrance of a desired lane across the width of the conveyor.

SUMMARY OF THE INVENTION

Generally, the above objects are accomplished according to the present invention by providing a first conveyor for conveying articles upright and single file; second conveyor for receiving articles from the first conveyor, said second conveyor being adapted to hold a plurality of rows of said articles; a plurality of parallel, spaced apart dividers, the space between each divider defining a lane, said dividers being positioned above the second conveyor and spaced apart from the first conveyor; a pivotally mounted guide chute having an inlet end for receiving articles from the first conveyor and an outlet end for discharging the articles into said lanes; means mounted on said guide chute for retaining said articles in the guide chute and for releasing a predetermined number of articles into a lane; means for indexing the guide chute from lane to lane to discharge articles thereinto, said means comprising: a support arm; a double acting, reversing pneumatic cylinder mounted on said arm; a connecting block slidably mounted on said arm, said connecting block at one end being positively connected to the piston drive rod of said first cylinder and pivotally connected to the chute whereby movement of the piston pivots the chute; said connecting block having a plurality of interconnected guide slots in one of its surfaces with a stop at each end of each slot, the distance from stop to stop being related to the distance from lane to lane; a second pneumatic cylinder mounted on said arm; and a cam follower mounted to a retaining block which is connected to the piston rod of the second cylinder, said cam follower being disposed to slide within said slots and to move from a locking position to a releasing position at each stop whereby when the locking pin moves to a releasing position the first cylinder will move the connecting block and chute to the next lane where a predetermined number of articles will be discharged into the lane; guide bar means movable between an extended position and a retracted position associated with the outlet end of said guide chute for guiding the article; said guide bar means having said extended position for guiding the article from the outlet end of the guide chute to adjacent a lane; said guide bar means having said retracted position for preventing said articles guided to adjacent said lane from being contacted by said guide bar means as the guide chute pivots; and guide bar actuation means associated with said guide bar means for moving said guide bar means between said extended position and said retracted position.

DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 4:
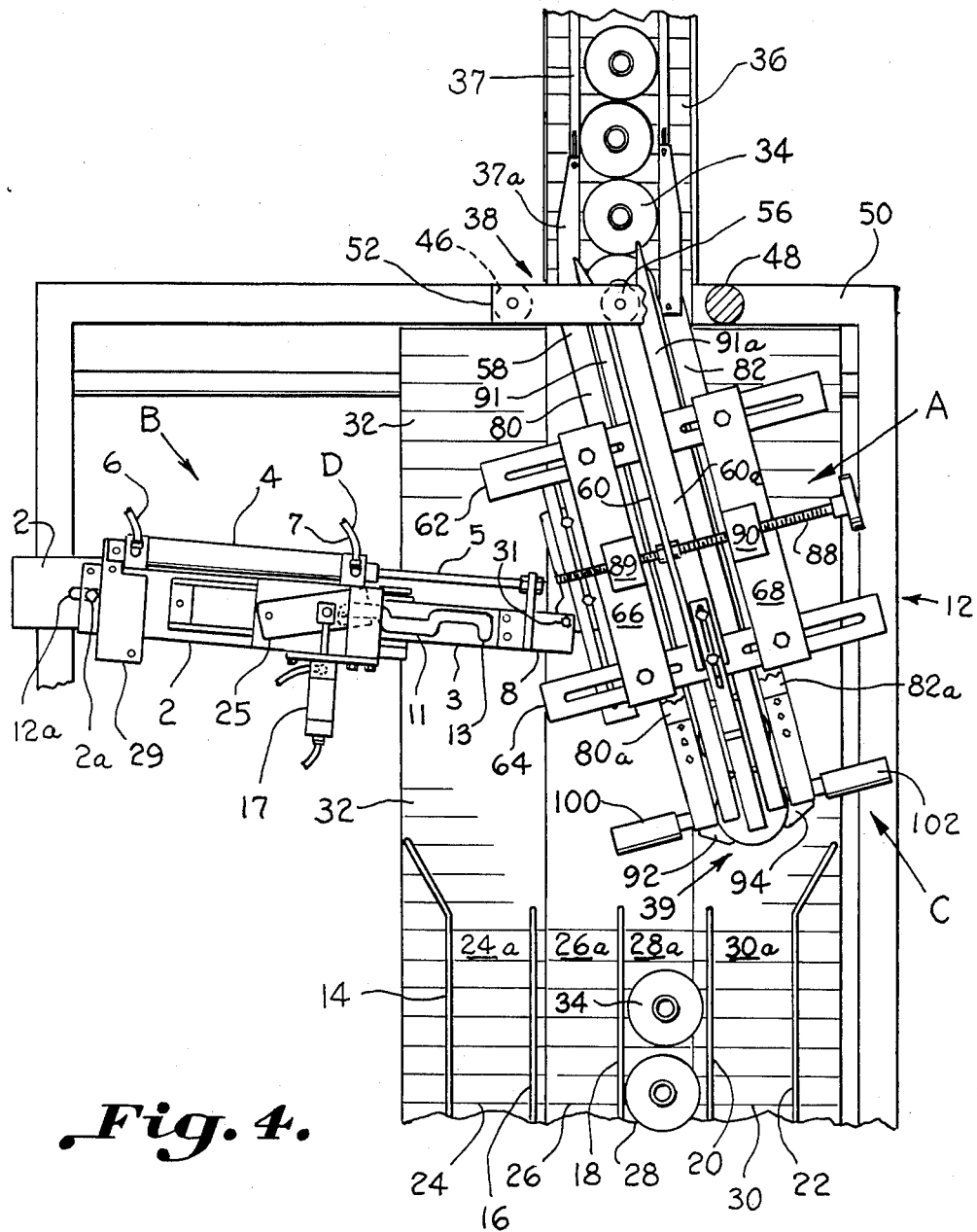
FIG. 4 is a partial plan view of one embodiment of an apparatus according to the present invention.
Figure 5:
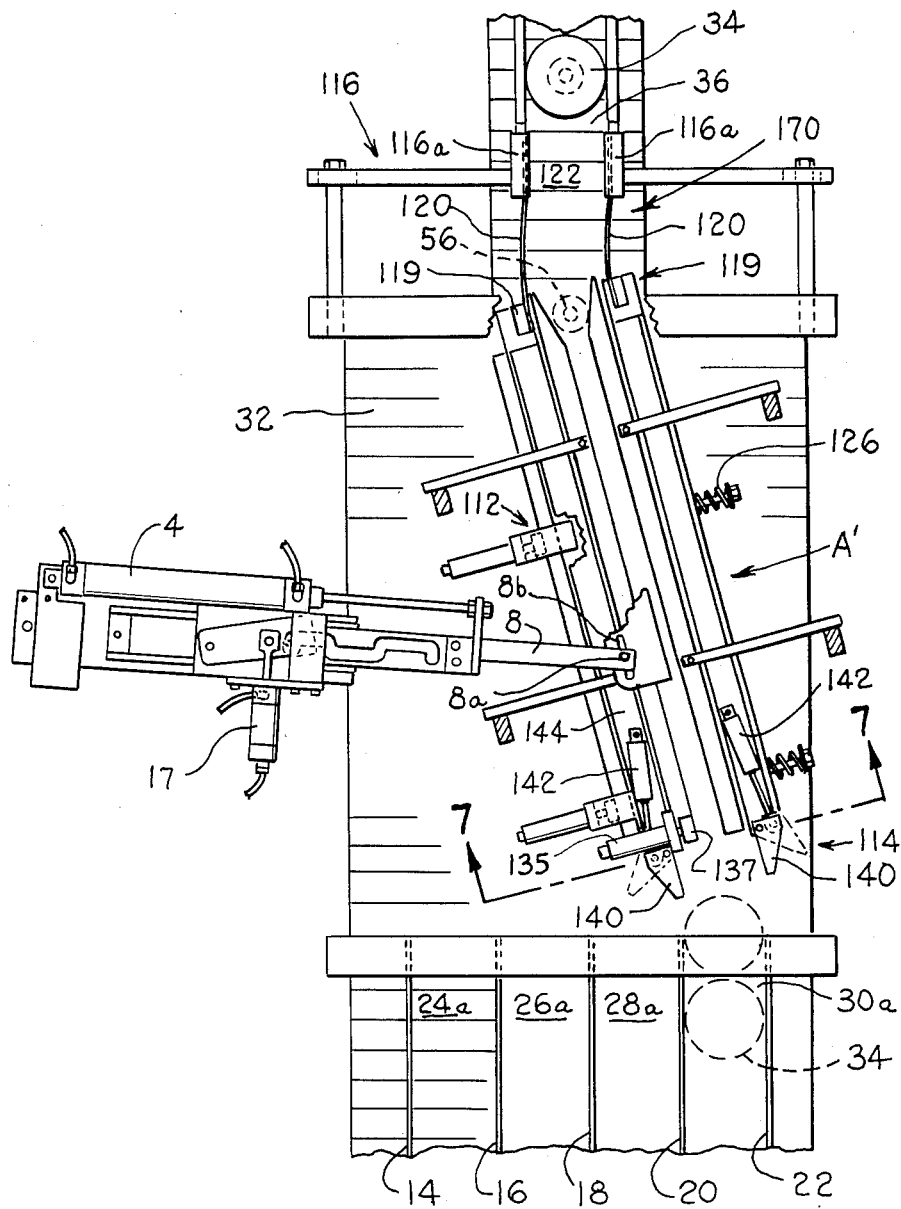
FIG. 5 is a partial plan view of an alternate embodiment of an apparatus according to the present invention.

Referring now in more detail to the drawings, and, in particular to FIG. 4, there is illustrated an article loading machine or apparatus, designated generally as 12, which includes the apparatus according to the present invention for aligning articles in parallel lanes for subsequent packing into cartons. The article loading machine 12 is of the type having a plurality of spaced dividers 14, 16, 18, 20, and 22 for separatiang the articles. Lanes 24, 26, 28 and 30 are defined between the respective dividers. The lanes are parallel and spaced across the width of the second conveyor means 32 and each lane includes an entrance designated respectively as 24a, 26a, 28a and 30a.

The apparatus according to the present invention includes a pivoting guide chute means, designated generally as A, which is carried by the frame of the article loading machine above conveyor 32. The pivoting guide chute receives the articles 34 after they have been arranged in single file on first conveyor 36 upstream of the pivoting guide chute means A. Inlet side frame means 37 channels the articles upstream and aligns them in a row at the inlet of the chute A. Frame means 37a pivotally connects frame 37 to the chute A. The pivoting guide chute means includes inlet 38 into which the articles 34 are fed and outlet 39 which dispenses the articles at the entrance end of the respective lanes across the width of the conveyor 32. It should be noted that conveyor 32 may have multiple belts, one of which can be a continuation of the conveyor 36. The main criterion, of course, is that conveyor 32 be wide enough to accommodate the desired number of lanes.

Indexing drive means B moves the pivoting guide chute means A in a reciprocating motion back and forth across the conveyor 32 to position and dispense the articles at a respective entrance end of each lane in succession and sequence across the width of the conveyor. A releasable feed means C is carried adjacent the outlet of the guide chute means having a closed position in which the articles are held upright until it is the proper time for an article to be dispensed, at which time the feed means opens. Control means (not shown) are carried by the guide chute to release the feed means C and allow a predetermined number of articles to be released and dispensed at the entrance of a lane. The control means may be a photocell or other suitable means well known in the art which count the number of articles passing thereby. When a predetermined number of articles have passed, a signal is sent to close the feed means C.

Preferably, the article loading machine includes below the conveyor 32 a lower conveyor (not shown) which will convey boxes or cartons in which the articles 34 are packed. The articles are loaded through a conventional grid set into the cartons either by means of the grid set being lowered or the cartons being raised in a conventional manner well known in the art.

Figure 6:
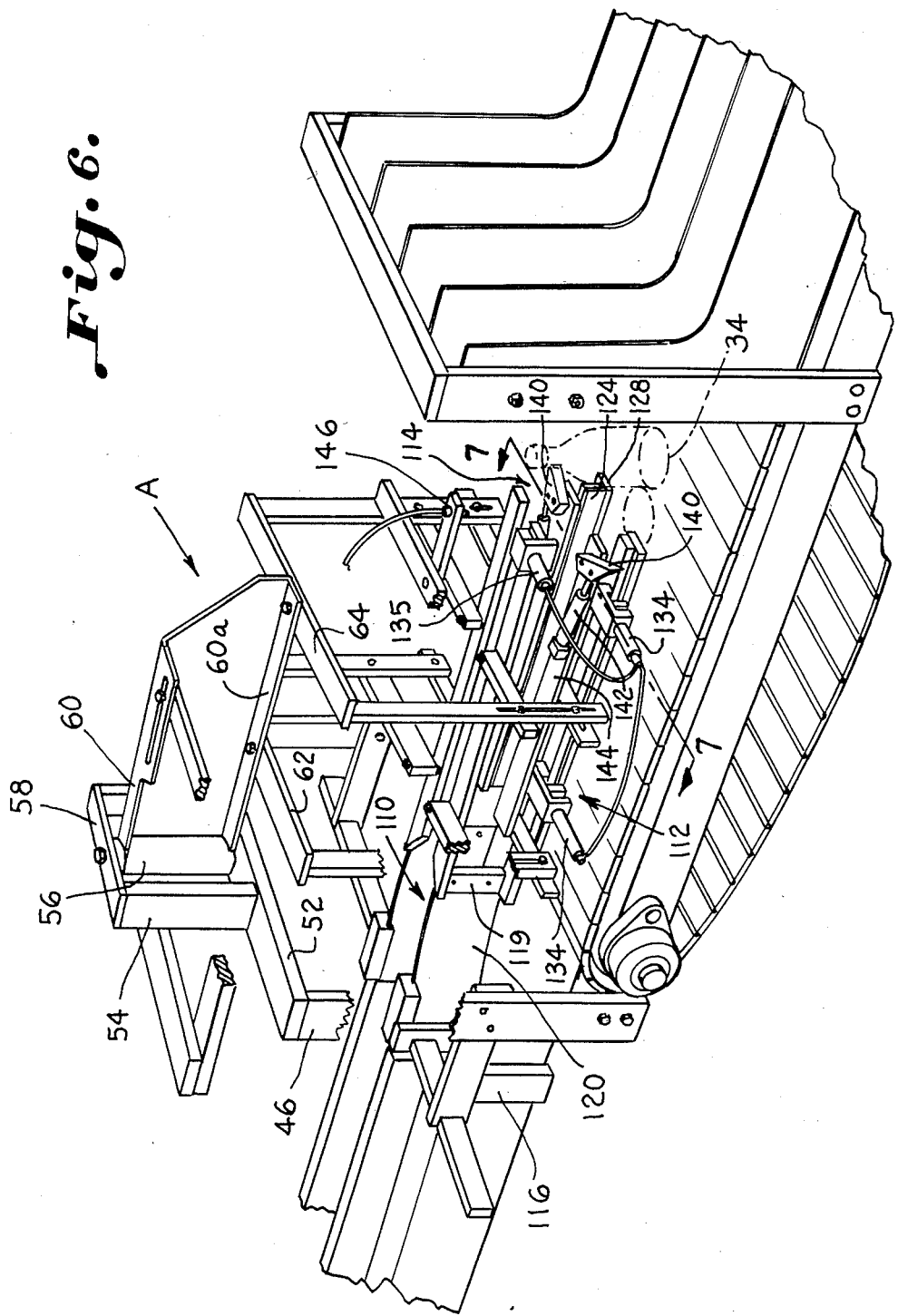
FIG. 6 is a perspective view of the alternate embodiment shown in FIG. 5 of an apparatus according to the present invention.

The frame 50 generally supports the second conveyor 32 and the pivotally mounted guide chute A by means of a pair of spaced standards 46 and 48 located on frame 50. Across the top of the standards is a bridge plate 52 which supports a second pair of standards, one of which is designated 54, and the other, being cut away, is not shown. A second bridge plate 58 interconnects the two standards, and a plate 60 is pivotally connected to a pivot 56 extending vertically between the plates 52 and 58, about which the plate 60 pivots (see FIGS. 4 and 6). Attached to the plate 60 is a bottom flange plate 60a. To the bottom flange plate 60a are attached a pair of cross members 62 and 64. Attached to the plates 62 and 64 is a pair of transverse plates 66 and 68. Vertical legs (not shown) depend downwardly from plates 66 and 68 and connect to lower plates which correspond to upper plates 66 and 68.

Chute means A includes adjustable side frame means for holding and containing articles 34 in the chute upright. The side frame means includes lower horizontal rail members 80, 80a, and 82, 82a, which guide the lower body portion of an article through the chute. The sides of the frame adjust by means of screw bolt 88 threaded into blocks 89 and 90 fixed to plates 66 and 68. As bolt 88 is turned, the side frames described above may be moved inwards or outwards since the side frames are attached by means of adjusting slots in the supporting structure.

Article alignment rails 91, 91a guide an upper portion of articles 34 as they pass through guide chute means A. Article alignment rails 91, 91a are attached to pivoting guide chute means A by a bracket assembly 93 (shown in FIG. 7).

Releasable feed means C includes a first engagement means which comprises a pivotable jaw 92 pivotally attached to bottom rail 80a. The engagement means further includes a pivotal jaw 94 carried on the opposing side of the chute outlet and pivotably attached to an opposing bottom rail (not shown). Each gripper jaw 92, and 94 may be formed from plastic or any other suitable material for gripping and holding the articles 34 upright against the inflow of articles at the inlet of the chute. For this purpose, the jaws are contoured to conform to the cylindrical shape of the bottle in the application illustrated. Actuation means for opening and closing the jaws includes a pair of air cylinders 100 and 102. The jaws 92 and 94 are connected to the respective pistons of air cylinders 100 and 102. When air is admitted to the cylinders, the jaws are closed against the article. When the air is vented from the cylinders the jaws open and release the article and allow it and succeeding articles to be dispensed into the entrance of a lane. When the photocell or electro/mechanical counter (not shown) has counted the predetermined number of articles 34, it then sends a signal to reactivate cylinders 100 and 102 to close jaws 92 and 94 to stop the next-in-line article. A suitable counter is one manufactured by Honeywell Microswitch of Freeport, Illinois, Model No. V3L-111-D8. The counter output is fed to a conventional computer which controls the valving to vent or admit air into the cylinders 100 and 102.

Figure 1:
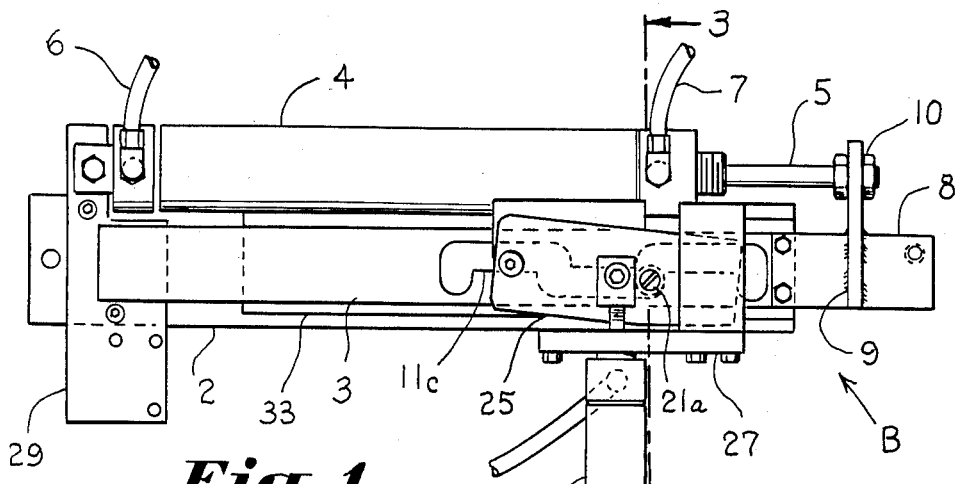
FIG. 1 is a top view of one embodiment of an indexing means for the apparatus of the present invention.
Figure 2:
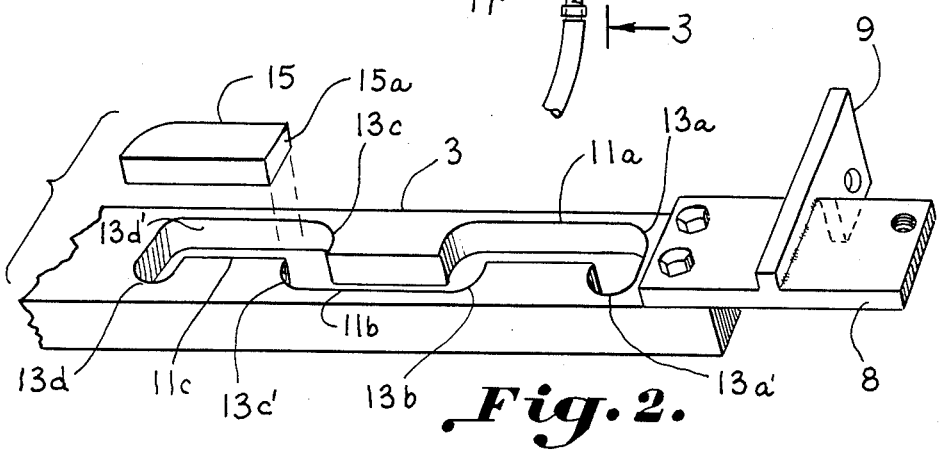
FIG. 2 is a perspective view of the connecting block which forms part of the indexing means shown in FIG. 1.
Figure 3:
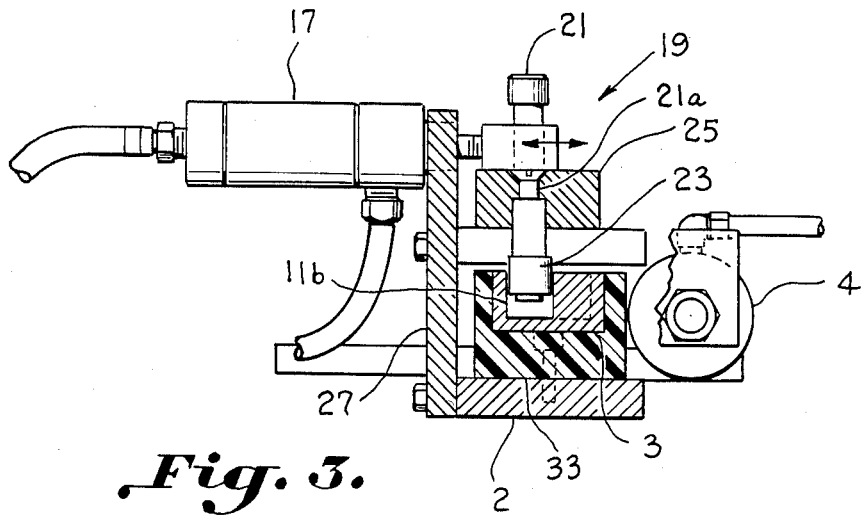
FIG. 3 is a sectional view along lines 3—3 of FIG. 1.

Indexing drive means B is an important and significant part of the present invention. Referring to FIGS. 1-3, the indexing means B comprises support arm 2, in which connecting block 3 is slidably carried by support member 29. First pneumatic cylinder 4, which is a double acting, reversing drive cylinder, is carried on the support arm 2, and the compressed air for the double action is supplied through hoses 6 and 7. The piston or piston drive rod 5 is connected through bolts 10 to transverse plate 9 which is mounted on connecting plate 8 at the end of connecting block 3 adjacent the chute.

Guide slots 11a, 11b, and 11c are shown in the upper surface of block 3. A plurality of such slots may be used corresponding to the number of lanes. The slots should be parallel, i.e., they should be in the same direction but they do not have to be collinear. An insert 15 may be provided to block a guide slot when the number of lanes is to be reduced. At the end of each slot 11a, b and c are provided stops 13a, b, c, and d which are formed by relatively short slots at right angles to the guide slots 11. These stops terminate in arcuate surfaces that transition into the adjacent guide slot and then, at the opposite end of the respective guide slot, transition through another arcuate surface into another stop slot, thus forming an interconnection of the guide slots.

Second cylinder 17 is mounted on mounting plate 27 which is carried by support arm 2, as can be seen in FIG. 3. Cam follower retaining block 25 is connected to the piston rod of the cylinder 17 by bolt 21. A sliding cam surface 23 or follower 23 is provided at the bottom of a bolt 21a, which is the portion the pin which follows and slides in the slots 11 and 13 of connecting block 3 to move horizontally, as indicated by the double-headed arrow 19 in FIG. 3. In the position shown in FIG. 3, the cam follower 23 is located in guide slot 11b. Connecting block 3 is shown slidably mounted in channel block 33 which is bolted to the support arm 2. When the block slides under the influence of cylinder 4 and the cam follower 23 remains stationary, the cam follower 23 will encounter one of the stops 13. At this point, further motion of the connecting block and chute is stopped. The cam follower retaining block 25 which is pivotally mounted as shown in FIG. 1 absorbs the main force of stopping the guide chute. When the block is stopped, it may be moved again by the cam follower being withdrawn or extended, as the case may be, to the second position within the respective stop slot 13, at which time the cam follower is free to slide in the next guide slot 11.

Constant air pressure is maintained on air cylinder 4, which must be reversed to return the guide chute to successive lanes when cam follower 23 is in position 13a' and 13d'' of the connecting block 3 when the insert 15 is not being used. When the insert 15 is in position, it will change the position of reversal when cam follower 23 is against the end 15a of the insert 15.

Referring again to FIG. 4, chute A is connected at pivot 31 to connecting plate 8 which in turn is fixed to connecting block 3. As shown in FIG. 4, the chute means A is positioned to load the extreme right hand lane at entrance 30a, and in this extreme position the piston rod 5 of cylinder 4 is extended the length of its full stroke. To hold the chute A in this position, the cylinder 17 will have placed the cam follower 23 in the locking position at 13d (see FIG. 2). Pistons 100 and 102 open jaws 92 and 94 to allow conveyor 32 to convey articles 34 into the chute entrance 30a. When the predetermined number of articles has been fed into the lane the jaws are then closed.

During the period of time that articles are being conveyed into the lane, compressed air is being fed into cylinder 4 through hose 7 to bring cylinder 4 to maximum pressure. On the other side of the piston, the hose 6 side, the cylinder is vented. When the jaws 92 and 94 close, a signal is sent by conventional computer or switching means (not shown) to the control valve (not shown) for piston 17, and the cam follower 23 is moved horizontally from its locking position 13d to a releasing position aligned with slot 11c of connecting block 3. The piston 5 will immediately move connecting block 3, causing the chute to move to lane 28a. Chute A will stop at lane 28a, which corresponds to stop 13c and which is at the first position in the stop (see FIG. 2). The same procedure takes place again as the lane is loaded and as compressed air is continuously fed through hose 7 to keep constant pressure on the piston within cylinder 4. Again, as the jaws 92, 94 close, the cam follower 23 will be moved to the position 13c' (FIG. 2), at which point the force of the piston rod 5 of cylinder 4 will cause the connecting block 3 to move relative to cam follower 23, which is repositioned from the next stop 13b as connecting block 3 is moved. This arrangement gives a surprisingly quick and positive movement to the chute and accurately aligns the chute discharge end with the entrance to a lane. The length of each slot is related to the distance between lanes and this is, of course, the chord of the arc segment through which the chute must pivot as it moves from one lane to the next.

Adjustment for lane width is accomplished by moving the support arm pivot point 8a within support member slot 8b. For narrow lanes to accommodate small bottles, the pivot point 8a is moved within slot 8b towards the pivot 56. On the other hand, for wider lanes to accommodate larger bottles, the pivot point 8a would be moved away from the pivot 56.

When the chute reaches the extreme left side to discharge articles into lane 24a, a computer (not shown) signals piston 17 to pull the cam follower 23 into position 13a', and a further signal is sent to shut off the compressed air supply to hose 7 and vent that side of cylinder 4 and to begin to feed compressed air into hose 6 for the return trip back across conveyor 32. At this point, when all lanes are filled, a retaining gate (not shown) will release all of the articles in the filled lanes to move to a grid where they will be loaded into cartons which, as mentioned below, may be positioned on a conveyor below second conveyor 32.

An alternate embodiment of the present invention is illustrateed in FIGS. 5 through 9. Pivoting guide chute A' includes flexible chute assembly 110, presser bar clamp assembly 112 and pivotal guide bar assembly 114.

Flexible guide chute assembly 110 channels the articles 34 from the first conveyor 36 to the inlet end of the pivoting guide chute A'. The flexible guide chute assembly 110 includes two spaced-apart, upstanding, flexible walls 120 which define an article passageway 122 therebetween. The flexible walls 120 are preferably made of high molecular weight plastic having a relatively slick surface, although other plastics or materials could be used. The inner ends of the walls 120 are fixed to blocks 116a forming part of conveyor bracket assembly 116 carried over conveyor 36. The other ends of the flexible walls 120 project into slots 119a provided in blocks 119 carried over the second conveyor 32. As the guide chute A' is indexed to the respective lanes, the leading ends of the flexible side walls 120 slide within the slots 119a, as shown in FIGS. 8 and 9.

Figures 8, 9:
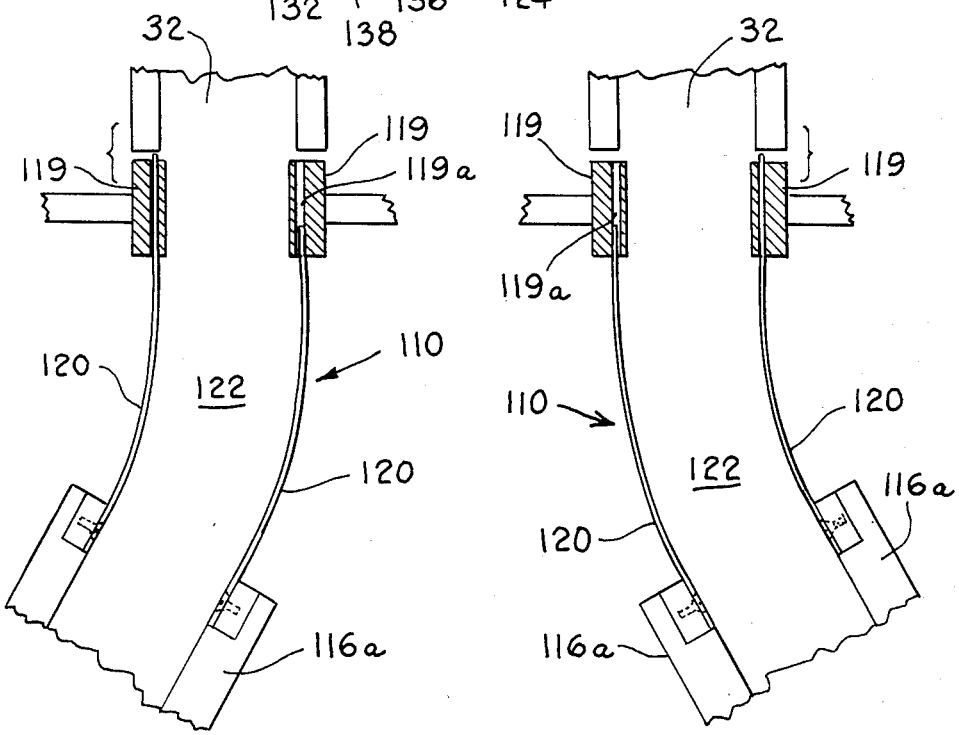
FIGS. 8 and 9 are partial plan views of a flexible guide chute assembly constructed in accordance with the present invention.

Referring to FIGS. 8 and 9, as pivoting guide chute A' pivots, flexible walls 120 bend, or flex, in a manner such that article passageway 122 is maintained, allowing articles 34 to continue to pass through flexible chute assembly 110. The ability of flexible walls 120 to flex as pivoting guide chute A' pivots allows for articles 34 to make a smooth and uniform transition during their conveyance into pivoting guide chute A' from first conveyor 36.

Presser bar clamp assembly 112 allows for articles 34 to be held securely within pivoting guide chute A' against the article line pressure delivered by preceding articles 34 still on first conveyor 36. Pressure bar clamp assembly 112 also allows for the articles to be held within pivoting guide chute A' while pivoting guide chute A' is pivoted. Further, pressure bar clamp assembly 112 allows for an article 34 to be released adjacent a lane entrance 24a, 26a, 28a, 30a at a predetermined time so that conveyor 32 will advance the article 34 on into the lane.

Presser bar clamp assembly 112 includes a longitudinally extending spring-biased rail 128 which is mounted to pivoting guide chute A' by spring mounts 126. Rail 128 is biased inwardly towards where articles 34 pass through pivoting guide chute A'. Rail 128 could be metal, plastic, or any other suitable material. A cushioned pad 124 is preferably provided along the inner edge of rail 130. Cushioned pad 124 could be made of rubber or any other suitable cushioning material.

A longitudinally extending, movable presser bar 132 is provided on pivoting guide chute A' opposite rail 130 and is connected to two pneumatically-actuatable cylinders 134. Actuation of cylinders 134, accomplished by introducing compressed air thereto, causes presser bar 132 to be urged towards rail 124, for gripping articles 34 therebetween. One cylinder is positioned near the inlet, and the other near the outlet of pivoting guide chute A'. A resilient strip 136 of plastic or other suitable resilient material is preferably provided along the inner edge 138 of presser bar 132 for slidingly contacting articles 34.

Pneumatic cylinders 134 operate independently of one another, which allows presser bar 132 to clamp one or more articles 34 against rail 124 within pivoting guide chute A'. The independent actuation of cylinders 134 also allows presser bar 132 to compensate for variations in the size of articles 34. Accordingly, presser bar clamp assembly 112 provides positive clamping of articles 34 of sufficient pressure to overcome the article line pressure generated by first conveyor 36.

Figure 7:
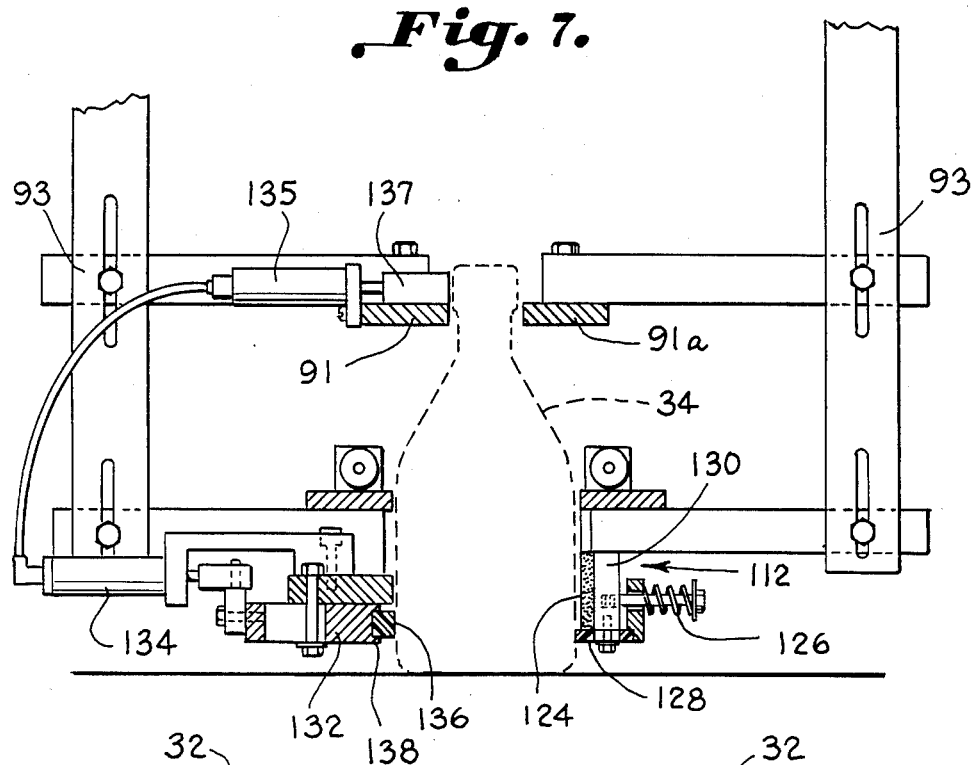
FIG. 7 is a sectional view along lines 7—7 of FIG. 6.

As shown in FIG. 7, another air cylinder 135 is provided by bracket 93 on at least one of the two article alignment rails 91, 91a. Air cylinder 135 has an article engaging foot 137 which positively engages an upper portion of an article 34 to hold the article 34 during pivoting of chute means A'.

Another movable presser bar (not shown) actuated by additional cylinders (likewise now shown) could be provided instead of rail 130 to increase the clamping pressure of presser bar clamp assembly 112 on articles 34. Presser bar clamp assembly 112 could be used in combination with jaws 92, 94 of chute A.

Pivotal guide bar assembly 114 provides additional guidance of an article 34 as the article 34 is released by presser bar clamp assembly 112 from pivoting guide chute A' for deposit adjacent a lane entrance 24a, 26a, 28a, 30a. Because an article sometimes lags as it leaves pivoting chute A', the article becomes improperly placed in relation to the correct lane entrance. When this occurs, the lagging or mispositioned article 34 could be hit by pivoting chute A' as pivoting chute A' shifts to the next lane, causing the article 34 to be knocked into the wrong lane or jammed between pivoting chute A' and a lane divider 14, 16, 18, 20, 22. Pivotal guide bar assembly 114 reduces the likelihood of this problem occurring by giving an article 34 released from pivoting chute A' positive guidance practically into, instead of in front of the lane.

Pivotal guide bar assembly 114 includes two guide bars 140, one pivotally mounted on each side of the outlet end of pivoting guide chute A'. The lengths of the guide bars 140 are chosen in relation to the size of articles 34. A pneumatic cylinder 142 is provided each guide bar 140 for pivoting the guide bar from an extended position, which effectively lengthens the length of pivoting chute A', to a retracted position, which effectively shortens the length of pivoting chute A'. Pneumatic cylinders 142 are pivotally mounted to a support bar 144 carried on each side of pivoting guide chute A'.

When pivoting chute A' is in a position to discharge an article 34 into a lane, cylinders 142 are extended, causing guide bars 140 to move to their extended position. This allows for article 34 to have positive guidance almost up until actual entry into a lane, thereby reducing the likelihood of article mispositioning problems. Immediately prior to the pivoting of pivoting chute A' to the next lane, cylinders 142 retract, causing guide bars 140 to move to their retracted position, as shown by the phantom lines in FIG. 5. The retraction of the guide bars 140 provides clearance between the outlet end of guide chute A' and any portion of discharged article 34 which may be extending into the pivotal path of pivoting chute A', thereby reducing the chance of pivoting chute A' hitting the discharged article 34.

The control of the actuation of presser bar clamp assembly 112, air cylinder 135, and of guide bar assembly 114 could be provided by an article-sensing photocell 146, or an electro/mechanical device (not shown), in a manner similar to that mentioned above pertaining to the control of jaws 92, 94 and by air cylinders 100, 102.

The indexing of the apparatus shown in FIGS. 5 through 9 is the same as the apparatus shown in FIGS. 1 through 4 and, therefore, its operation will not be described again.

Controls, switches, valves, and other means to operate the cylinders are conventional and may be arranged by anyone skilled in the art when reference is made to the drawings and foregoing description. It will be understood, of course, that while the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. Apparatus for aligning articles in parallel rows for packing, comprising:
   (a) first conveyor for conveying articles upright in single file;
   (b) second conveyor for receiving articles from the first conveyor, said second conveyor being adapted to hold a plurality of rows of said articles;
   (c) a plurality of parallel, spaced apart dividers, the space between each divider defining a lane, said dividers being positioned above the second conveyor and spaced apart from the first conveyor;
   (d) a guide chute pivotally mounted to receive articles from the first conveyor and to discharge the articles into said lanes;
   (e) means mounted on said guide chute for retaining articles in the guide chute and for releasing a predetermined number of articles into a lane;
   (f) means for indexing the guide chute from lane to lane to discharge articles thereinto, said means comprising:
      (1) a support arm;
      (2) a double acting, reversing pneumatic cylinder mounted on said support arm;
      (3) a connecting block slidably mounted on said arm, said connecting block at one end being positively connected to the piston drive rod of said first cylinder and pivotally connected to the guide chute whereby movement of the piston pivots the guide chute;
      (4) said connecting block having a plurality of interconnected guide slots in one of its surfaces with a stop at each end of each slot; the distance from stop to stop being related to the distance from lane to lane;
      (5) a second pneumatic cylinder mounted on said arm; and
      (6) a cam follower mounted on the piston rod of the second cylinder, said cam follower being disposed to slide within said slots and to move from a locking position to a releasing position at each stop, so that when the cam follower moves to a releasing position, the first cylinder will move the connecting block and guide chute to the next lane where a predetermined number of articles will be discharged into the lane.

2. The apparatus of claim 1, wherein all the guide slots are non-collinear.

3. The apparatus of claim 1, wherein at least two guide slots are collinear.

4. The apparatus of claim 3, wherein the guide slots are in the upper surface of the connecting block and the second cylinder moves the cam follower horizontally from a locking position to a releasing position.

5. The apparatus of claim 4, wherein the stop at each end of each guide slot defines a relatively short slot interconnected with the adjacent guide slot and at a right angle thereto.

6. The apparatus of claim 5, wherein the length of each guide slot is related to the chord of the arc segment through which the guide chute pivots in moving from lane to lane.

7. The apparatus of claim 6, including means for restoring and maintaining pressure within the drive side of the first cylinder at each stop so that when the cam follower is moved to a releasing position, the first piston will move with maximum force.

8. The apparatus of claim 7, including means for reversing air flow to the first cylinder at the two extreme stops.

9. In an apparatus for aligning articles in parallel rows for packing, said apparatus including a conveyor on which articles are conveyed upright in single file, a pivoting guide chute having an article inlet end for receiving articles from the conveyor and an article outlet end for directing the articles into lanes defined by parallel dividers, a lane indexing means comprising:
   (a) first drive means for moving said pivoting guide chute the width of the conveyor to position the outlet end of said guide chute means adjacent an entrance end of each lane;
   (b) connecting block means for connecting said drive means to the guide chute in driving engagement, said block means having a plurality of interconnected guide slots with a two position stop associated with the end of each slot, the length of each slot corresponding to the chord of the arc segment through which the guide chute pivots in moving from lane to lane;
   (c) cam follower means mounted for sliding within said guide slots, said cam follower means including second drive means for moving the cam follower means between a locking position and a releasing position at each stop so that movement of the cam follower means from one position to the other will release the connecting block and first drive means to pivot the guide chute to the entrance of the next lane; and
   (d) means for holding articles within the chute as the chute swings from the entrance of one lane to another.

10. The lane indexing means of claim 9, wherein the first drive means includes a reversing pneumatic cylinder comprising:
   (1) a fixedly mounted cylinder housing; and
   (2) a drive piston within said housing connected to the connecting block such that at the end of a stroke of the first drive means, reversal of the cylinder will reverse the direction of the connecting block so that the chute will return in successive stops to the entrance of each lane.

11. The lane indexing means of claim 10, wherein the connecting block means comprises:
   (i) an elongated block, said block being slidably mounted and connected at one end to the chute and at the other end to the piston of the first drive means;
   (ii) the plurality of interconnected slots being located in the upper surface of the block;
   (iii) each slot comprising a linear portion and an arcuate portion at each end thereof;
   (iv) said slots being interconnected through said arcuate portions, said interconnection having a relatively short linear portion which terminates at each end in a respective arcuate portion with its associated arcuate portions defining a two position stop.

12. The lane indexing means of claim 11, wherein the cam follower means comprises:
 (i) a generally cylindrical pin mounted for sliding within said interconnected slots;
 (ii) second drive means comprising a pneumatic cylinder for moving said pin from a locking position to a releasing position at each stop so that when the pin is moved to a releasing position, the connecting block and chute are free to be moved to the next locking position by the first drive means.

13. The lane indexing means of claim 9, wherein the means for holding articles within the chute comprises:
 guide rail means associated with the chute for contacting the articles, said guide rail means extending longitudinally adjacent the articles in the chute;
 presser bar means associated with the chute for contacting the articles said presser bar means being movable towards said guide rail means for holding the articles therebetween; and
 presser bar actuation means associated with said presser bar means for moving said presser bar means towards said guide rail means.

14. The lane indexing means of claim 13, wherein the presser bar actuation means includes releasing means for releasing a predetermined number of articles from the chute.

15. The lane indexing means of claim 13, wherein said presser bar actuation means includes two pneumatic cylinders, spaced apart from one another, connected to said presser bar means, for moving said presser bar means towards said guide rail means.

16. The lane indexing means of claim 13, wherein said guide rail means includes an article guide rail spring-mounted to the chute, for contacting the articles.

17. The lane indexing means of claim 9, further comprising:
 guide bar means movable between an extended position and a retracted position associated with the outlet end of the pivoting guide chute, for guiding the articles; said guide bar means having said extended position for guiding the article from the outlet end of the chute to adjacent one of the lanes defined by the parallel dividers; said guide bar means having said retracted position for preventing said article guided to adjacent said one of the lanes from being contacted by said guide bar means as the chute pivots; and
 guide bar actuation means associated with said guide bar means for moving said guide bar means between said extended position and said retracted position.

18. The lane indexing means of claim 17, wherein said guide bar means includes two spaced-apart, pivotally mounted guide bars which pivot between said extended position and said retracted position.

19. The lane indexer means of claim 17, wherein said guide bar actuation means includes pneumatic cylinders connected to said guide bar means for moving said guide bar means between said extended position and said retracted position.

20. The lane indexing means of claim 9, further comprising:
 flexing chute means providing an article passageway for guiding the articles upright in single file as the articles are conveyed from the conveyor to the pivoting guide chute; said flexing chute means flexing is accordance with the pivoting of the pivoting guide chute for maintaining the article passageway therethrough.

21. The lane indexing means of claim 20, wherein the flexing chute means comprises two upright flexible walls spaced apart from one another for allowing the articles to pass therebetween.

22. Apparatus for aligning articles in parallel rows for packing, comprising:
 (a) first conveyor means for conveying articles upright in single file;
 (b) second conveyor means for receiving articles from the first conveyor means, said second conveyor means being adapted to hold a plurality of rows of said articles;
 (c) a plurality of parallel, spaced apart dividers, the space between each divider defining a lane, said dividers being positioned above the second conveyor means and spaced apart from the first conveyor means;
 (d) a pivotally mounted guide chute having an inlet end for receiving articles from the first conveyor means and an outlet end for discharging the articles adjacent said lanes;
 (e) means mounted on said chute for retaining articles in the guide chute and for releasing a predetermined number of articles into a lane;
 (f) means for pivotally indexing the guide chute from lane to lane to discharge articles thereinto;
 (g) flexing chute means defining an article passageway for guiding the articles upright in single file as the articles are conveyed from the first conveyor means to the guide chute; said flexing chute means flexing in accordance with the pivoting of the guide chute for maintaining the article passageway therethrough; and
 (h) repositionable guide means connected to the outlet end of the guide chute, said repositionable guide means being movable to a guiding position for guiding the articles from the guide chute to adjacent a lane and movable to a retracted position for preventing said articles guided to adjacent said lane from being contacted by said repositionable guide means as the guide chute pivots.

23. The apparatus of claim 22, wherein the means mounted on said guide chute for retaining articles in the guide chute and for releasing a predetermined number of articles into a lane comprises:
 guide rail means associated with the guide chute for contacting the articles; said guide rail means extending longitudinally adjacent articles in the guide chute;
 presser bar means associated with the chute for contacting the articles, said presser bar means being movable towards said guide rail means for holding articles therebetween; and
 presser bar actuation means for moving said presser bar means towards said guide rail means.

24. The apparatus of claim 22, wherein said repositionable guide means includes:
 guide bar means pivotal between said guiding position and said retracted position; and
 guide bar actuation means associated with said guide bar means for pivoting said guide bar means between said guiding position and said retracted position.

* * * * *